Sept. 2, 1930.    B. LORMÜLLER    1,774,836
BRAKING SYSTEM FOR VEHICLES
Filed July 12, 1929
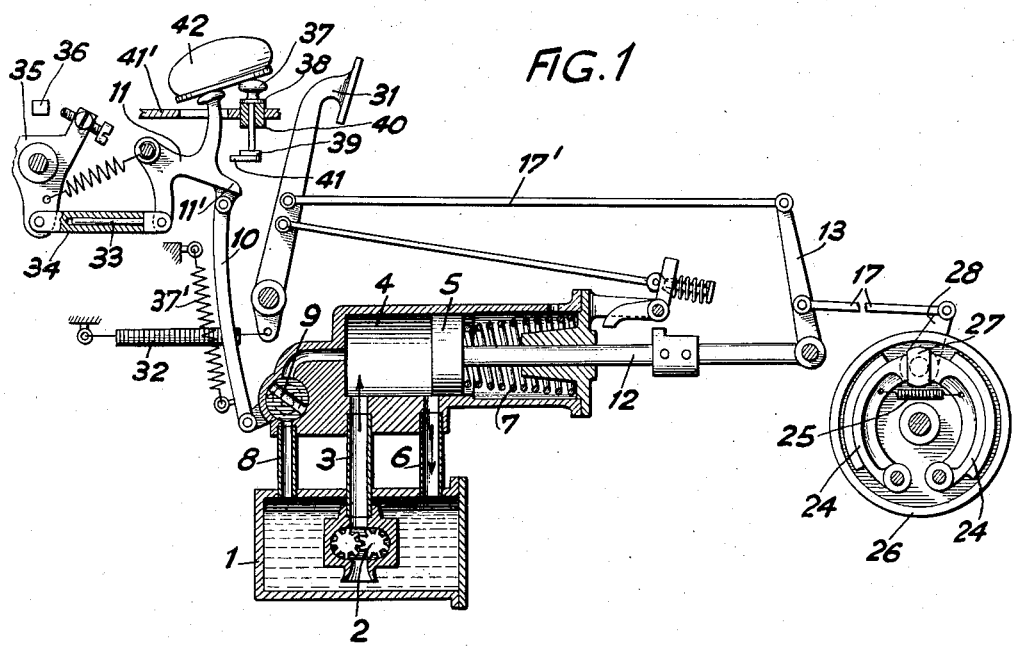
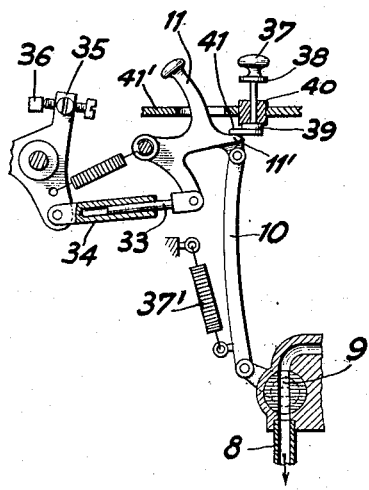
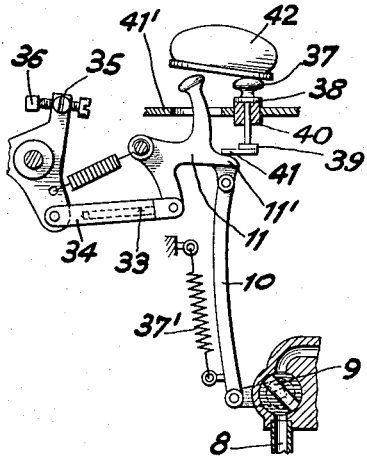
INVENTOR:
Bernhard Lormüller,
By Henry Orth Jr
Atty.

Patented Sept. 2, 1930

1,774,836

UNITED STATES PATENT OFFICE

BERNHARD LORMÜLLER, OF ZURICH, SWITZERLAND, ASSIGNOR OF ONE-HALF TO THE FIRM W. A. WETTERWALD & CO., OF ZURICH, SWITZERLAND

BRAKING SYSTEM FOR VEHICLES

Original application filed October 13, 1927, Serial No. 225,944, and in Germany July 24, 1927. Divided and this application filed July 12, 1929, Serial No. 377,756.

The present invention relates to improvements in braking systems for vehicles and particularly to devices for controlling the power and the brakes of motor driven vehicles and is a division of my application Ser. No. 225,944 filed October 13, 1927.

Devices are known for controlling the power and the brakes of motor driven vehicles by a member, for instance a gas pedal serving in the driving of the car and also operable when stoppage or lessening of the speed is contemplated. The operation of such devices is such that releasing the gas pedal causes auxiliary means to move the brake members into their operative position, whilst upon depressing the gas pedal over a certain portion of its total travel the gas pedal is in the neutral position in which neither the auxiliary means nor the throttle are acted upon, the further depressions of the gas pedal causes the throttle to be opened. Thus the first part of the travel of the gas pedal serves for controlling the brakes and the second part for controlling the power as is the case with the braking system forming the subject matter of my basic application mentioned above. Between this first part and second part there is a neutral point and it is difficult for the driver to hold the gas pedal in this neutral point for only a short time if necessity arises; a sudden jerk of the car owing to a hole in the road will cause a sudden release of the driver's foot and an undesired sudden application of the brakes.

This drawback is overcome in the device according to the present invention by the provision of a foot rest near said gas pedal to permit the latter and the foot rest to be simultaneously acted upon by the driver's foot, said foot rest being operatively connected to said gas pedal so that a depression of the foot rest into a fixed position causes a movement of the gas pedal into its neutral position, whilst a further depression of the gas pedal by the driver's foot tilting about the depressed foot rest causes an actuation of the throttle and a control of the power, and a release of both accelerator pedal and foot rest causes the brakes to become operative.

A constructional example of the subject matter of the present invention is illustrated on the accompanying drawings, in which Fig. 1 shows the brake mechanism in the position during the ordinary running of the vehicle and the device for controlling the power and the brakes, Fig. 2 shows the device in the position when the brakes have to be applied, and Fig. 3 shows the device in the neutral position.

Referring to the drawings an oil casing 1 is provided in which is situated a pump 2 which pump communicates by a pipe 3 with a cylinder 4 having fitted therein a piston 5. The cylinder 4 communicates with the casing 1 by means of a pipe 6 which is a return pipe. Circulation of oil—or any other suitable fluid if desired—is thus established between the pump and the cylinder, a pressure thus being maintained against the piston 5 which keeps it in the position shown in Fig. 1, against the pressure of a spring 7 which is contained in the cylinder and held in the compressed condition as shown, between the piston 5 and the internal end flange of the said cylinder.

In addition to the oil circulating system 2, 3, 6, 1, there is provided another fluid circulation from the pump 2 through pipe 3 to the cylinder 4, through pipe 8 to casing 1 and back to the pump 2. In Fig. 1 this pipe 8 is shown as closed by a rotary valve 9, which by means of a connecting rod 10 is pivoted to the gas lever or accelerator 11 which controls the usual gas admission. The piston 5 is fixed to the connecting rod 12 which at its other end is pivoted to one end of a floating lever 13. Intermediate of its ends a brake rod 17 is pivoted to the lever 13 and the other end of the latter is linked to a brake lever or brake pedal 31 by a pull rod 17', the brake pedal serves for the application of the effective braking pressure and is returned into its initial position by the spring 32.

The arrangement of the brake shoes 24, tension spring 25, drum 26, cam 27, and brake lever 28 to which is articulated the end of the brake rod 17, is of ordinary and well known type.

To the accelerator 11 is pivoted the rod 33 which serves to operate through pivoted member 34 the double arm lever 35 having the adjusting screw shown to limit the movement of the said lever 35 to and from the member 36. These details form no part of my invention per se, and are given merely as an example of a gas regulating device. Near the accelerator 11 a vertically displaceable foot rest 37 is arranged provided with two collars 38 and 39 adapted to cooperate with a bush 40 fixed in the foot board 41'. To the lower collar 39 an extension 41 is fixed which cooperates with the part 11' of the accelerator 11. 42 denotes the driver's foot placed above the foot rest 37 and the accelerator 11.

The operation is as follows:

When the vehicle is running in the ordinary way the foot of the driver depresses the foot rest 37 so far that its collar 38 rests on the foot board 41' and tilts about the foot rest 37 as fulcrum and depresses thereby the gas pedal 11 for the usual gas admission and power control (Fig. 1). The valve 9 is kept by the depressed gas pedal in the closed position and the auxiliary brake mechanism is inoperative.

When it is intended to close the throttle without applying the brakes the driver's foot 42 remains on the depressed foot rest 37 but tilts back so far that the gas pedal is released as is shown in Fig. 3. The part 11' of the gas pedal 11 abuts against the extension 41 of the foot rest 37 by the action of the spring 37', the valve 9 is still closed and this is the neutral position in which neither gas is given nor the brake is applied. The driver's foot 42 is in a definite position and this neutral position is thus well defined.

When the foot is lifted off the foot rest 37 and off the gas lever 11 as is shown in Fig. 2, the spring 37' causes the turning of the gas pedal, whereby the foot rest 37 is raised so that its lower collar 39 rests against the foot board 41' and the valve 9 is turned into its open position. The auxiliary mechanism is rendered operative as described in the basic patent and the braking of the car will occur.

I claim:

1. A device for controlling the power and the brakes of motor driven vehicles, in combination, a braking drum, braking elements cooperating with said drum, auxiliary means operatively connected to said braking elements for causing a movement of the latter, a gas pedal, means operatively connected to said gas pedal for controlling said auxiliary means, a depressible foot rest provided near said gas pedal to permit the latter and the foot rest to be simultaneously acted upon by the driver's foot, and means operatively connecting said foot rest to said gas pedal so that a depression of the foot rest into a fixed position causes a movement of the gas pedal into its neutral position, whilst a further depression of the gas pedal by the driver's foot tilting about the depressed foot rest causes opening of the throttle and control of power and a release of both gas pedal and foot rest causes the brakes to move into their operative position.

2. A device for controlling the power and the brakes of motor driven vehicles, in combination, a braking drum, braking elements cooperating with said drum, auxiliary means operatively connected to said braking elements for causing a movement of the latter, a gas pedal, means operatively connected to said gas pedal for controlling said auxiliary means, a depressible foot rest provided near said gas pedal to permit the latter and the foot rest to be simultaneously acted upon by the driver's foot, and means provided on said foot rest and adapted to cooperate with said means operatively connecting said gas pedal to said auxiliary means, so that a depression of the foot rest into a fixed position causes a movement of the gas pedal into its neutral position, whilst a further depression of the gas pedal by the driver's foot tilting about the depressed foot rest causes opening of the throttle and control of power and a release of both gas pedal and foot rest causes the brakes to move into their operative position.

3. A device for controlling the power and the brakes of motor driven vehicles, in combination, a braking drum, braking elements cooperating with said drum, auxiliary means operatively connected to said braking elements for causing a movement of the latter, a gas pedal, means operatively connected to said gas pedal for controlling said auxiliary means, a foot rest guided in the foot board of the vehicle near said gas pedal to permit the latter and the foot rest to be simultaneously acted upon by the driver's foot, collars on said foot rest to fix the extreme positions of said foot rest, and means provided on said foot rest and adapted to cooperate with said means operatively connecting said gas pedal to said auxiliary means so that a depression of the foot rest into a fixed position causes a movement of the gas pedal into its neutral position, whilst a further depression of the gas pedal by the driver's foot tilting about the depressed foot rest causes opening of the throttle and control of power and a release of both gas pedal and foot rest causes the brakes to move into their operative position.

In testimony whereof I have signed my name to this specification.

BERNHARD LORMÜLLER.